United States Patent [19]

Dorsey

[11] Patent Number: 5,201,562
[45] Date of Patent: Apr. 13, 1993

[54] TRUCK POOL APPARATUS

[76] Inventor: Johnathan D. Dorsey, 5512 N. Garrison Ave., Tulsa, Okla. 74126

[21] Appl. No.: 864,589

[22] Filed: Apr. 7, 1992

[51] Int. Cl.⁵ .............................................. B62D 33/02
[52] U.S. Cl. .................................. 296/39.2; 296/37.6; 4/492; 4/494
[58] Field of Search .................... 296/39.2, 39.1, 37.6; 4/494, 513, 492, 488, 506

[56] References Cited

U.S. PATENT DOCUMENTS

| | | | |
|---|---|---|---|
| 601,976 | 4/1898 | Murray | 296/39.1 |
| 3,418,005 | 12/1968 | Allina | 296/39.1 X |
| 3,648,300 | 3/1972 | Eisenberg | 4/494 |
| 4,890,874 | 1/1990 | Davis | 296/39.2 |
| 4,986,590 | 1/1991 | Patti et al. | 296/39.2 |

FOREIGN PATENT DOCUMENTS 182341 2/1936 Switzerland .

Primary Examiner—Robert R. Song
Attorney, Agent, or Firm—Leon Gilden

[57] ABSTRACT

A truck bed insert is arranged of unitary construction complementarily being received within a pickup truck bed. A drain opening is arranged to permit draining of water directed into the insert subsequent to use. A modified aspect of the invention includes a pneumatic conduit directed about an intersection of the floor and side walls of the insert having nozzles directed into the insert cavity, with an impeller housing arranged for mounting to the pickup exhaust pipe to direct aeration into the insert during use.

8 Claims, 4 Drawing Sheets

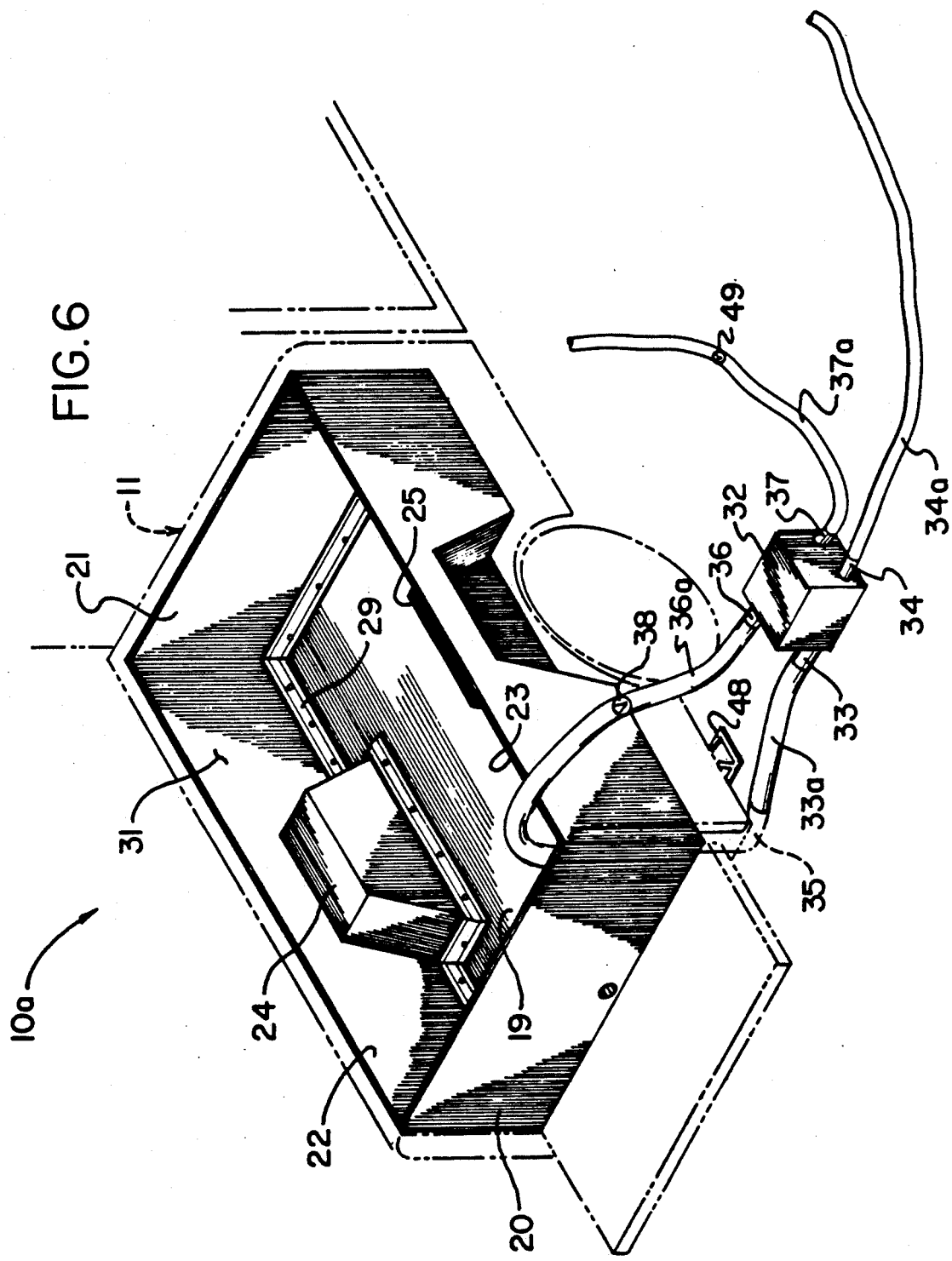

TRUCK POOL APPARATUS

BACKGROUND OF THE INVENTION

1. Field of the Invention

The field of the invention relates to truck bed insert structure, and more particularly pertains to a new and improved truck pool apparatus wherein the same is arranged to accommodate fluid for use in bathing and recreation by individuals within an associated pickup truck.

2. Description of the Prior Art

Pickup truck bed liners of various types are utilized throughout the prior art in various configurations to accommodate various workpieces and the like for transport by the pickup truck structure. The instant invention attempts to overcome deficiencies of the prior art in providing for a unitary insert arranged to accommodate fluid filling for bathing and recreation events. Prior art truck bed insert liners are described and set forth in the U.S. Pat. Nos. 4,767,149; 4,872,720; 4,890,874; 4,505,508; and 4,944,612. The aforenoted patents are set forth as examples of pickup truck bed liner structure.

Accordingly, it may be appreciated that there continues to be a need for a new and improved truck pool apparatus as set forth by the instant invention which addresses both the problems of ease of use as well as effectiveness in construction in providing for a swimming pool structure for use in recreation and in this respect, the present invention substantially fulfills this need.

SUMMARY OF THE INVENTION

In view of the foregoing disadvantages inherent in the known types of truck bed liner apparatus now present in the prior art, the present invention provides a truck pool apparatus wherein the same is arranged to accommodate fluid filling within a pickup truck bed. As such, the general purpose of the present invention, which all be described subsequently in greater detail, is to provide a new and improved truck pool apparatus which has all the advantages of the prior art truck bed insert structure and none of the disadvantages.

To attain this, the present invention provides a truck bed insert arranged of unitary construction complementarily being receiving within a pickup truck bed. A drain opening is arranged to permit draining of water directed into the insert subsequent to use. A modified aspect of the invention includes a pneumatic conduit directed about an intersection of the floor and side walls of the insert having nozzles directed into the insert cavity, with an impeller housing arranged for mounting to the pickup exhaust pipe to direct aeration into the insert during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck pool apparatus which has all the advantages of the prior art truck bed insert structure and none of the disadvantages.

It is another object of the present invention to provide a new and improved truck pool apparatus which may be easily and efficiently manufactured and marketed.

It is a further object of the present invention to provide a new and improved truck pool apparatus which is of a durable and reliable construction.

An even further object of the present invention is to provide a new and improved truck pool apparatus which is susceptible of a low cost of manufacture with regard to both materials and labor, and which accordingly is then susceptible of low prices of sale to the consuming public, thereby making such truck pool apparatus economically available to the buying public.

Still yet another object of the present invention is to provide a new and improved truck pool apparatus which provides in the apparatuses and methods of the prior art some of the advantages thereof, while simultaneously overcoming some of the disadvantages normally associated therewith.

These together with other objects of the invention, along with the various features of novelty which characterized the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the further aspect of the invention utilized in association with a pickup truck.

DESCRIPTION OF THE PREFERRED EMBODIMENT

Figure 1:
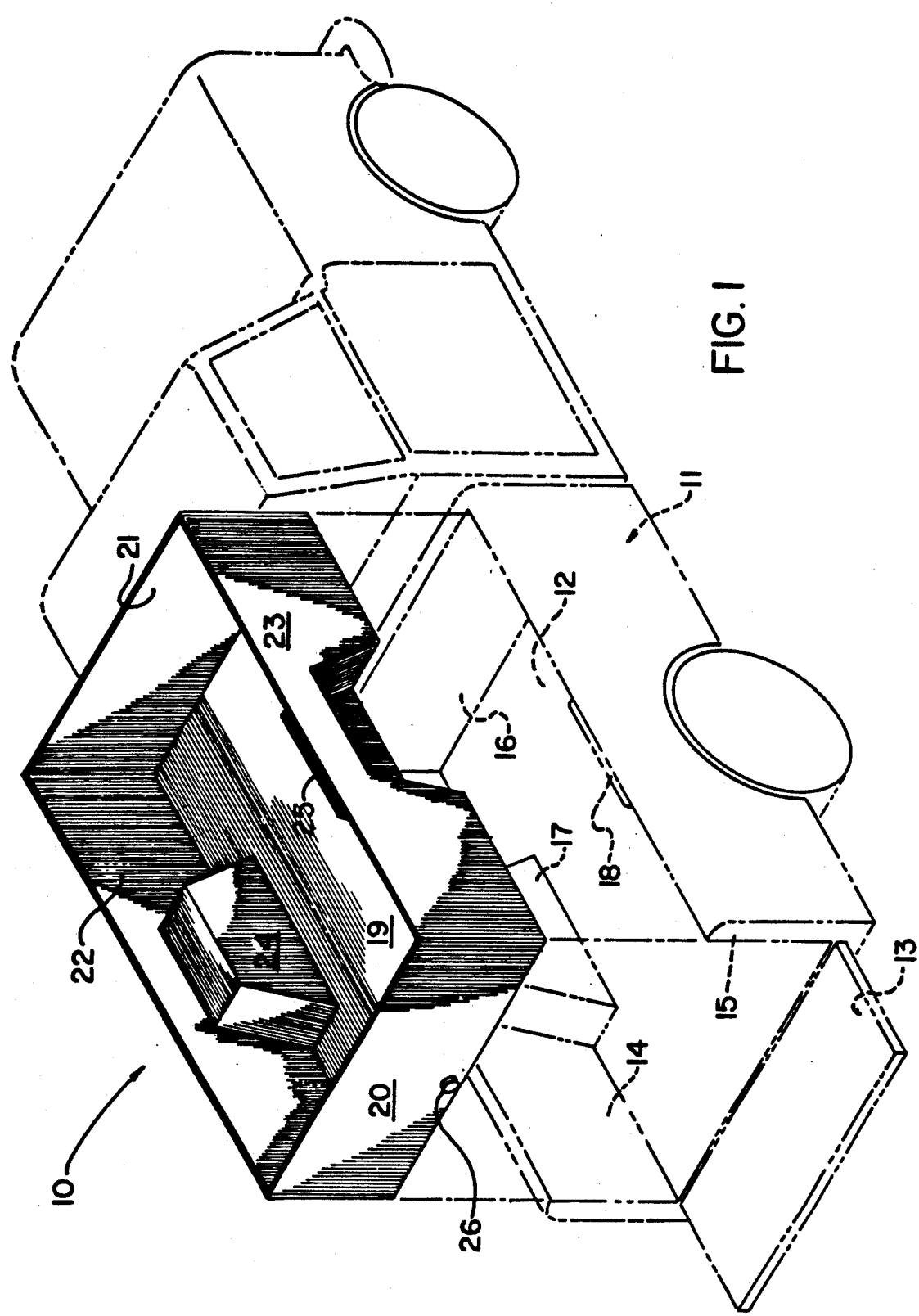
FIG. 1 is an isometric illustration of the instant invention.
Figure 3:
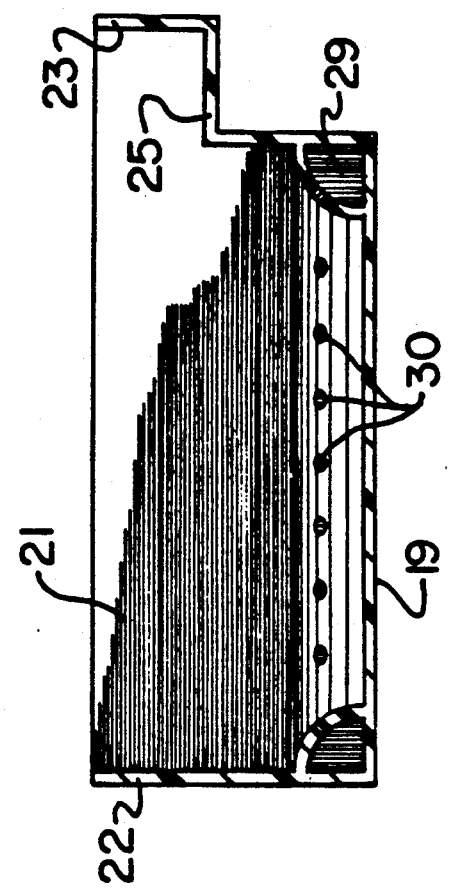
FIG. 3 is an orthographic view, taken along the lines 3—3 of FIG. 2 in the direction indicated by the arrows.

With reference now to the drawings, and in particular to FIGS. 1 to 6 thereof, a new and improved truck pool apparatus embodying the principles and concepts of the present invention and generally designated by the reference numerals 10 and 10a will be described.

More specifically, the truck pool apparatus 10 of the invention essentially comprises insertion within a pickup truck bed 11, such as a type as illustrated in FIG. 1, having a truck bed 11 to include a truck bed floor 12, a pivotally mounted tailgate 13, a truck left side wall 14 spaced from and parallel a truck right side wall 15. A truck forward wall 16 extends orthogonally between forward distal ends of the right and left walls 14 and 15. The fluid container insert of the invention includes a fluid container floor 19 having a fluid container rear wall 20 spaced from a container forward wall 21 spaced apart a predetermined distance substantially equal to the distance between the truck tailgate 13 and the truck forward wall 16. The container having a container left side wall 22 spaced from a container right side wall 23 a predetermined spacing equal to a predetermined spacing between the truck left side wall 14 and the truck right side wall 15. The truck is further arranged to include a truck right wheel well housing 17 and a truck left wheel well housing 18, wherein similarly the container includes a container left wheel well housing 24 to complementarily receive the truck left wheel well housing 18, with a container right wheel well housing 25 arranged to complementarily receive the truck's right wheel well housing 17. It should be further noted that each wall of the container 19 is equal to a predetermined height substantially equal to a predetermined height of the walls of the truck bed 11. Further, as various truck beds have various pockets along the top surfaces of the side walls, the container structure may be further formed with various projections to be received within these truck wall pockets if desired to increase stability of the organization relative to the truck bed. A drain conduit 26 is directed through the container rear wall 20 adjacent the container floor 19 having a conduit plug 27 removably mounted from the conduit 25 either interiorly or exteriorly of the container.

In this manner, the insert is merely positioned within the truck bed 11, filled with water, and accordingly an aquatic pool for recreational purposes is available to individuals providing for mobility of the pool for use at various locations as desired.

Figure 2:
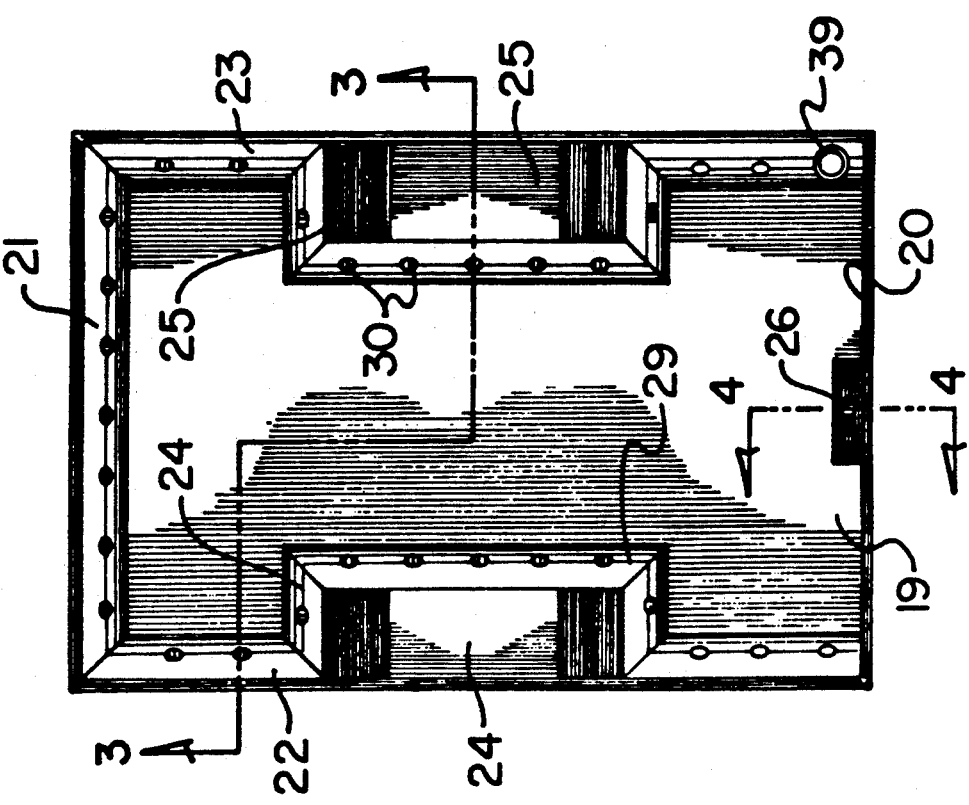
FIG. 2 is an orthographic top view of a modified aspect of the invention.
Figure 4:
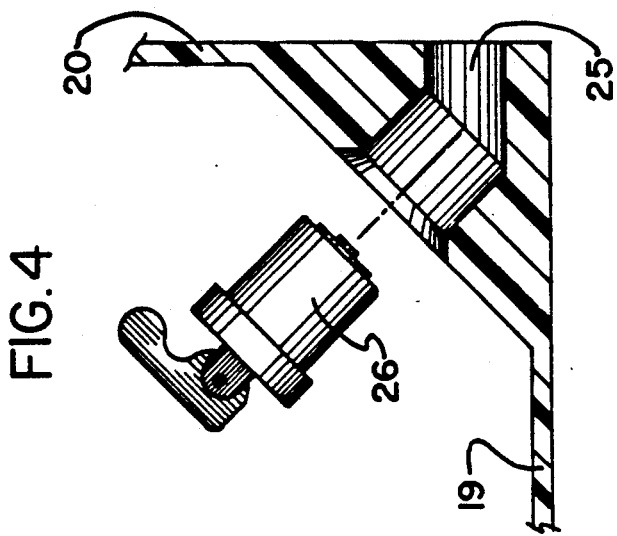
FIG. 4 is an orthographic view, taken along the lines 4—4 of FIG. 2 in the direction indicated by the arrows.

The FIGS. 2–6 illustrate a modified apparatus 10a to include a pneumatic conduit 29 fixedly mounted within the container at intersections of the floor 19, with the forward wall 21, left side wall 22, and right side wall 23. The pneumatic conduit 29 includes a plurality of spaced nozzles 30 directed into the container in pneumatic communication between the pneumatic conduit 29 and the container cavity 31 to direct pressurized air into the cavity 31 for a bubbling effect to enhance enjoyment of the device in use. The nozzles 30 are directed coextensively about the pneumatic conduit 29, in a manner as illustrated in FIG. 2 for example.

Figure 5:
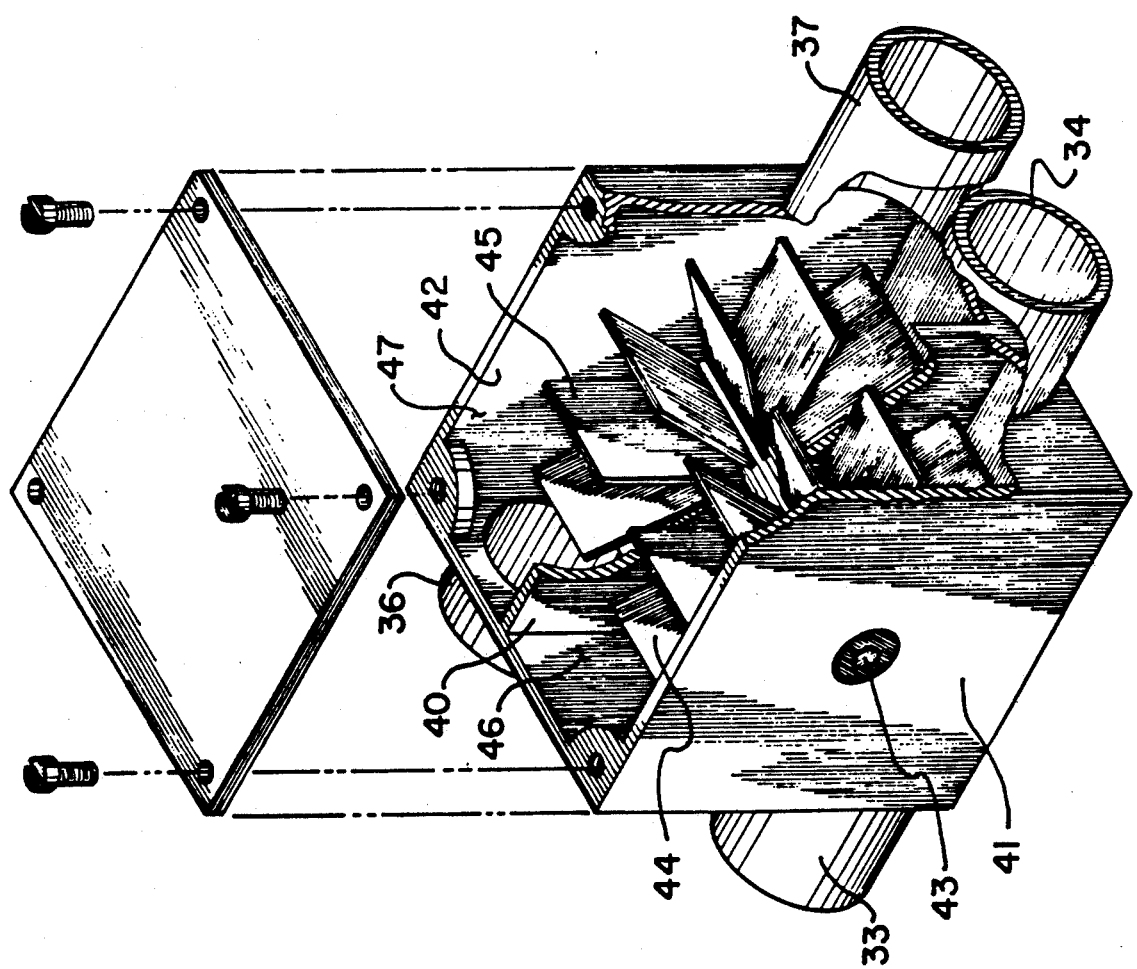
FIG. 5 is an isometric illustration of the impeller structure utilized by the invention.

An impeller housing 32 is provided to effect directing pressurized air into the container cavity 31. The impeller housing 32 includes an impeller housing first conduit 33 directed through a forward end wall of the impeller housing spaced from a second conduit 34 directed through a rear wall of the housing. The first and second conduits 33 and 34 are in pneumatic communication with an impeller housing first cavity 46, in a manner as illustrated in FIG. 5. Impeller housing third conduit 36 and impeller housing fourth conduit 37 are directed through respective forward and rear walls of the impeller housing in pneumatic communication with the impeller housing second cavity 47, with the first and second cavities 46 and 47 divided relative to one another within the impeller housing by a partition wall 40 oriented parallel and between the impeller housing's first and second side walls 41 and 42. An impeller housing first hose 33a is directed to the first conduit 33 and to a vehicular exhaust pipe 35 of the associated truck member to direct pressurized gas from the exhaust pipe 35 through the first conduit 33 into the impeller housing first cavity 46. The exhausted pressurized gas is directed from the impeller housing first cavity 46 through the impeller housing second conduit 34 and the associated second conduit hose 34a to direct such exhaust gas in a spaced relationship relative to the associated vehicle. The impeller housing's first cavity 46 includes a first impeller 44, with the impeller housing having a second cavity 47 between the partition wall and the second side wall 42. The impeller housing second cavity 47 includes a second impeller 45 therewithin, with the first and second impellers 44 and 45 coaxially aligned and fixedly mounted to a single impeller axle 43. The impeller axle 43 is rotatably and fixedly mounted through the impeller housing's first and second side walls 41 and 42 medially thereof, as well as the partition wall 40, whereupon rotation of the first impeller 44 effects simultaneous rotation of the second impeller 45. To this end, the impeller housing formed with a third conduit 36 directed from the impeller housing's second cavity 47 is secured to a receiving tube 39 in pneumatic communication with the pneumatic conduit 29. A check valve 38 is positioned within the third conduit 36 to prevent back flow of fluid through the third conduit 36. An impeller housing's fourth conduit 37 directed through a rear wall of the impeller housing 32 into the second cavity 47 provides for a source of fresh air, with a third conduit hose 36a effecting communication between the third conduit 36 and the receiving tube 39, with a fourth conduit hose 37a directed from the fourth conduit in a spaced relationship relative to the impeller housing to permit reception of a source of fresh air spaced from the second conduit hose 34a to minimize mixing of fresh air with exhausted air from the second conduit hose 34a.

If required, support jack structure 48 is positioned below the truck bed 11 to provide for additional support for the truck bed to accommodate additional weight of the container filled with water.

It should be further noted to insure proper flow of pneumatic air into the impeller housing second cavity, a further check valve 49 within the fourth conduit hose or even the fourth conduit to insure one-way flow of air into the impeller housing second cavity for ultimate directing of such air into the pneumatic conduit 29 in a pressurized condition to effect aeration of fluid within the container cavity 31.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A truck pool apparatus for reception within a truck bed, with the truck bed having a truck bed floor, a truck bed tailgate, and a truck bed forward wall, a truck left side wall spaced from a truck right side wall, and a truck right wheel well housing projecting through the floor adjacent the truck right side wall, and a truck left wheel well housing projecting through the truck bed floor adjacent the truck left side wall, the apparatus comprising, a fluid container, the fluid container having fluid container floor arranged for complementary reception upon the truck bed floor, and a container rear wall spaced from a container forward wall, a container left side wall spaced from a container right side wall, and a container left wheel well housing spaced from a container right wheel well housing, with the container left wheel well housing arranged for receiving the truck right wheel well housing therewithin, and the container right wheel well housing arranged for receiving the truck right wheel well housing therewithin, and the container rear wall having a drain conduit directed therethrough adjacent the container floor, and a conduit plug arranged for projection selectively within the drain conduit.

2. An apparatus as set forth in claim 1 wherein the container defines a container cavity between the container left side wall, the container right side wall, the container rear wall, the container forward wall, and the container floor, and a pneumatic conduit fixedly mounted within the container and within the container cavity at an intersection between the container right side wall, container left side wall, container forward wall, and container floor, with the pneumatic conduit extending about the container left wheel well housing and container right wheel well housing, the pneumatic conduit including a plurality of spaced nozzles in pneumatic communication between the container cavity and the pneumatic conduit directed into the container cavity from the pneumatic conduit.

3. An apparatus as set forth in claim 2 wherein the pneumatic conduit includes a receiving tube, and an impeller housing positioned exteriorly of the container, with the impeller housing including an impeller housing first side wall spaced from an impeller housing second side wall, an impeller housing forward wall spaced from an impeller housing rear wall, and a partition wall within the impeller housing extending coextensively between the forward wall and rear wall arranged parallel and medially between the impeller housing first side wall and the impeller housing second side wall defining a first cavity between the partition wall and the impeller housing first side wall, and a second cavity between the partition wall and the impeller housing second side wall, and a first conduit directed through the impeller housing forward wall, and a second conduit directed through the impeller housing rear wall, with the impeller housing first conduit and the impeller housing second conduit in pneumatic communication with the impeller housing first cavity, and an impeller housing third conduit directed through the impeller housing forward wall, an impeller housing fourth conduit directed through the impeller housing rear wall, with the impeller housing third conduit and the impeller housing fourth conduit in pneumatic communication with the impeller housing second cavity, and an impeller housing third conduit hose in pneumatic communication between the impeller housing third conduit and the receiving tube to direct pressurized air into the pneumatic conduit.

4. An apparatus as set forth in claim 3 including an impeller housing fourth conduit hose mounted to the impeller housing fourth conduit to permit spacing of the impeller housing fourth conduit hose relative to the impeller housing, and a check valve mounted within the impeller housing third conduit hose to prevent fluid flow from the container cavity into the impeller housing.

5. An apparatus as set forth in claim 4 including an impeller housing first conduit hose secured to the impeller housing first conduit, with first conduit hose arranged for securement to an exhaust pipe of the truck.

6. An apparatus as set forth in claim 5 with the impeller housing fourth conduit including a fourth conduit hose to direct exhausted gas from the impeller housing in a spaced relationship relative to the impeller housing.

7. An apparatus as set forth in claim 6 including an impeller axle directed orthogonally and medially between the impeller housing first side wall, partition wall, and impeller housing second side wall, with the impeller axle rotatably mounted within the impeller housing, and a first impeller assembly fixedly mounted to the impeller axle within the impeller housing first cavity, and a second impeller assembly mounted to the impeller axle within the impeller housing second cavity, whereupon rotation of the first impeller assembly within the impeller housing first cavity effects rotation of the second impeller assembly within the impeller housing second cavity.

8. An apparatus as set forth in claim 7 including a further check valve mounted within the impeller housing fourth conduit hose to permit one-way flow of air from exteriorly of the impeller housing fourth conduit hose into the impeller housing second cavity.

* * * * *